US007020667B2

(12) United States Patent
Guest et al.

(10) Patent No.: US 7,020,667 B2
(45) Date of Patent: Mar. 28, 2006

(54) SYSTEM AND METHOD FOR DATA RETRIEVAL AND COLLECTION IN A STRUCTURED FORMAT

(75) Inventors: Michael Alan Guest, San Jose, CA (US); Frederick Thomas Sharp, Menlo Park, CA (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 10/198,827

(22) Filed: Jul. 18, 2002

(65) Prior Publication Data

US 2004/0015523 A1    Jan. 22, 2004

(51) Int. Cl.
*G06F 17/30*    (2006.01)
(52) U.S. Cl. .................. 707/204; 707/203; 707/205
(58) Field of Classification Search ............... 707/102, 707/104.1, 513, 202, 203, 205
See application file for complete search history.

(56) References Cited

U.S. PATENT DOCUMENTS

| | | | | |
|---|---|---|---|---|
| 5,826,258 A * | 10/1998 | Gupta et al. | ................... | 707/4 |
| 5,848,413 A | 12/1998 | Wolf | ........................... | 707/10 |
| 5,893,127 A | 4/1999 | Tyan et al. | ................... | 707/513 |
| 5,974,430 A | 10/1999 | Mutschler, III et al. | .... | 707/505 |
| 6,078,924 A | 6/2000 | Ainsbury et al. | ........... | 707/101 |
| 6,128,624 A | 10/2000 | Papierniak et al. | ......... | 707/104 |
| 6,141,666 A | 10/2000 | Tobin | ......................... | 707/513 |
| 6,282,537 B1 * | 8/2001 | Madnick et al. | ................ | 707/4 |
| 6,327,589 B1 | 12/2001 | Blewett et al. | ................. | 707/5 |
| 6,356,899 B1 | 3/2002 | Chakrabarti et al. | ........... | 707/5 |
| 6,360,306 B1 * | 3/2002 | Bergsten | ..................... | 707/204 |
| 6,493,720 B1 * | 12/2002 | Chu et al. | ................ | 707/104.1 |
| 6,532,473 B1 * | 3/2003 | Niazi et al. | ............. | 707/103 X |
| 6,636,845 B1 * | 10/2003 | Chau et al. | ..................... | 707/1 |
| 6,657,647 B1 * | 12/2003 | Bright | ......................... | 715/856 |
| 6,704,736 B1 * | 3/2004 | Rys et al. | ................... | 707/100 |
| 6,778,541 B1 * | 8/2004 | Houston et al. | ............ | 370/401 |

(Continued)

FOREIGN PATENT DOCUMENTS

CA        2250663        7/1941

(Continued)

OTHER PUBLICATIONS

M2 Presswire, MICROSTRATEGY: DSS broadcaster-the industry's first information broadcaster server, Mar. 20, 1998.*

(Continued)

*Primary Examiner*—Jean M. Corrielus
*Assistant Examiner*—Baoquoc N. To
(74) *Attorney, Agent, or Firm*—Samuel A. Kassatly

(57) ABSTRACT

A data collection and retrieval system and associated method allow the capture and replication of data presented at various Web pages into a database application through text parsing of the HTML source code of that document. The system allows the user to select one or more Web pages containing data of interest; to specify exactly which data within any page is to be captured; to specify how frequently data is to be collected; and to specify the conditions for collection and retrieval. The advantage of the system is realized through efficient, automated data collection that would otherwise be impractical. The system includes an initialization stage and an automatic execution stage. The initialization stage provides the user interface which allows the user to select the source file that contains data the user wishes to copy, target database that will receive the data, and timing criteria for automatic transfer of data. The automatic execution stage automatically transfers the data from the source file to the target database as instructed by the user in the initialization stage.

20 Claims, 7 Drawing Sheets

U.S. PATENT DOCUMENTS

| | | | |
|---|---|---|---|
| 6,847,999 B1* | 1/2005 | Dodrill et al. | 709/225 |
| 6,886,020 B1* | 4/2005 | Zahavi et al. | 707/204 |
| 2001/0007991 A1 | 7/2001 | Tobin | 709/203 |
| 2001/0018707 A1 | 8/2001 | Seta | 709/218 |
| 2001/0042089 A1 | 11/2001 | Tobin | 709/1 |
| 2001/0047356 A1 | 11/2001 | Ren et al. | 707/9 |
| 2002/0010682 A1 | 1/2002 | Johnson | 705/59 |
| 2002/0013791 A1* | 1/2002 | Niazi et al. | 707/516 |
| 2002/0083087 A1 | 6/2002 | Deuser et al. | 715/500 |
| 2002/0150041 A1* | 10/2002 | Reinshmidt et al. | 370/216 |
| 2002/0184170 A1* | 12/2002 | Gilbert et al. | 706/20 |
| 2004/0230569 A1* | 11/2004 | Rys et al. | 707/3 |
| 2005/0086646 A1* | 4/2005 | Zahavi et al. | 717/131 |

FOREIGN PATENT DOCUMENTS

| | | |
|---|---|---|
| WO | WO 01/24046 A2 | 4/2001 |
| WO | WO 01/75673 A2 | 10/2001 |

OTHER PUBLICATIONS

Chandramouli et a. Application of XML Tools for Enterprise-Wide RBAC Implementation Task, Proceedings of the fifth ACM workshop on Role-Based access control, Jul. 2000, p. 11-18.*

Tao Guan et al., "KPS—A Web Information Mining Algorithm," downloaded from WWW URL http://www8.org/w8-papers/4a-search-mining/kps/kps.html, on Mar. 15, 2002.

D. Taniar et al., "Structured Web Pages Management for Efficiebt Data Retrieval," IEEE 2000, pp. 97-104.

F. Ferri et al., "Toward a Retrieval of HTML Documents Using a Semantic Approach," IEEE 2000, pp. 1571-1574.

H. Kinutani et al., "Identifying Result Subdocuments of XML Search Conditions," IEEE 2001, pp. 254-261.

J. Cardiff et al., "Querying Multiple Databases Dynamically on the World Wide Web," IEEE 2000, pp. 238-245.

F. Esposito et al., "A Machine Learning Approach to Web Mining," AI*IA 99: Advances in Artificial Intelligence, 6th Congress of Italian Association for Artificial Intelligence, Sep. 14-17, 1999, pp. 190-201.

T. Boyd et al., "The Active Guidebook—Information Retrieval by Keyword and Location," IFIP TC6 / WG6.1 Third International Working Conference in Distributed Applications and Interoperable Systems, 2001, pp. 55-66.

H. Kim et al., "Building an XML and Web-Based Document Retrieval System," 20th National Online Meeting, Proceedings 1999, May 18-20, 1999, pp. 251-262.

Seung-Jin Lim et al., "An Automated Approach for Retrieving Hierarchical Data from HTML Tables," CIKM'99, 1999, pp. 466-474.

Sangho Ha et al., "Mapping XML Documents to the Object-Relational Form," ISIE 2001, pp. 1757-1761.

Michael Cutler et al., "Using the Structure of HTML Documents to Improve Retrieval," Proceedings of the USENIX Symposium on Internet Technologies and Systems, 1997,.

* cited by examiner

SYSTEM AND METHOD FOR DATA RETRIEVAL AND COLLECTION IN A STRUCTURED FORMAT

FIELD OF THE INVENTION

The present invention generally relates to the field of data processing, and particularly to a software system and associated method for use with Web pages to transfer data from a Web page source file to a target database. More specifically, this invention pertains to a method for parsing a Web page source file, collecting the specified data on the Web page, automatically retrieving the specified data on a predetermined frequency or scheduled time, and then storing the collected data in a database structure.

BACKGROUND OF THE INVENTION

The World Wide Web (WWW) is comprised of an expansive network of interconnected computers upon which businesses, governments, groups, and individuals throughout the world maintain inter-linked computer files known as Web pages. Users navigate these pages by means of computer software programs commonly known as Internet browsers. Web sites and Web pages found on the WWW present a wide range of data to users in varying formats. This data, such as weather information or stock quotes, may be useful in a variety of ways to the Internet user beyond simply viewing that data in the form and location as it is displayed on the Internet.

Transferring data found on websites to a database format would allow significant data management and manipulation capabilities afforded through standard database software. However, there are currently no effective methods for capturing and replicating that data within a database application. The user can always manually transfer the data viewed on the Internet into a database. However, when transfer is done on a regular basis, such as might be done for a regular recording of stock prices, the transfer of data from the website to the user's database becomes inefficient, labor intensive, and prone to transcription errors. This is particularly true for large amounts of data on a large variety of Web pages that are retrieved periodically, such as every 10 minutes, 45 minutes, daily, etc.

Current systems exist for transferring Internet data to databases for archiving Web content in the form of a source file and visual representation, allowing subsequent viewing of that data at a later date. While allowing the user to capture data and archive it, these systems do not provide a mechanism for parsing individual data elements, replicating that data in a relational database format, or automatic data collection in a manner specified by the user.

Another system described in U.S. Pat. No. 6,078,924 to Ainsbury et. al. retrieves data from a wide range of document formats and converts that data into a common format and location. This system includes the capability to collect data automatically in a manner specified by the user. It also allows the retrieval of data from a wide range of data formats, including the capability to retrieve data from HTML documents. However, while the data is collected and replicated in a central format and location such as a spreadsheet, it does not effectively account for issues of relational database replication.

Thus, there is need for a data collection and retrieval system and method to efficiently manipulate and analyze data displayed on websites. The system and method should be able to retrieve Internet data automatically and to assign that data to appropriate places in a database structure defined by the user. For data that changes regularly such as stock quotes or weather data, a system is desired which will automatically retrieve data based on a user defined schedule. The need for such a system and associated method has heretofore remained unsatisfied.

SUMMARY OF THE INVENTION

The system and method for data collection and retrieval satisfy this need, and allow the capture and replication of data presented at various Web pages into a database application through text parsing of, for example, the HTML source code of the retrieved documents. Consequently, users may efficiently collect a wide range of data from a wide variety of sources, and have that data available in user-specified applications, for further data management and processing.

The data collection and retrieval system of the current invention allows the user to select one or more Web pages containing data of interest; to specify exactly which data within any page is to be captured; to specify how frequently data is to be collected; and to specify the conditions for collection and retrieval. The conditions for replication include data formatting and database parameters. The advantage of the present system and method is realized through efficient, automated data collection that would otherwise be impractical.

The present system and method generally comprise an initialization stage and an automatic execution stage. The initialization stage provides the user interface which allows the user to select:

the source file that contains data the user wishes to copy;

the target database that will receive the data; and the timing criteria for automatic transfer of data.

The automatic execution stage automatically transfers the data from the HTML source file to the target database as instructed by the user in the initialization stage.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Database: The term "database" refers, for example, to a database, a data storage device, or a memory.

GUI: Graphical User Interface, a program interface that takes advantage of the computer's graphics capabilities to make the program easier to use.

HTML (Hypertext Markup Language): A standard language for attaching presentation and linking attributes to informational content within documents. During a document authoring stage, HTML "tags" are embedded within the informational content of the document. When the Web document (or "HTML document") is subsequently transmitted by a Web server to a Web browser, the tags are interpreted by the browser and used to parse and display the document. In addition to specifying how the Web browser is to display the document, HTML tags can be used to create hyperlinks to other Web documents.

Internet: A collection of interconnected public and private computer networks that are linked together with routers by a set of stand protocols to form a global distributed network.

Schema: A database design, comprised of tables with columns, indexes, constraints, and relationships to other tables. The column specification includes a data type and related parameters such as the precision of a decimal or floating-point number.

Server: A software program or a computer that responds to requests from a Web browser by returning ("serving") Web documents.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of Web documents and of navigating from one document to another.

Web Site: A database or other collection of inter-linked hypertext documents ("Web documents" or "Web pages") and associated data entities, which is accessible via a computer network, and which forms part of a larger, distributed informational system such as the WWW. In general, a Web site corresponds to a particular Internet domain name, and includes the content of a particular organization. Other types of Web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet user—server hypertext distributed information retrieval system.

Figure 1:
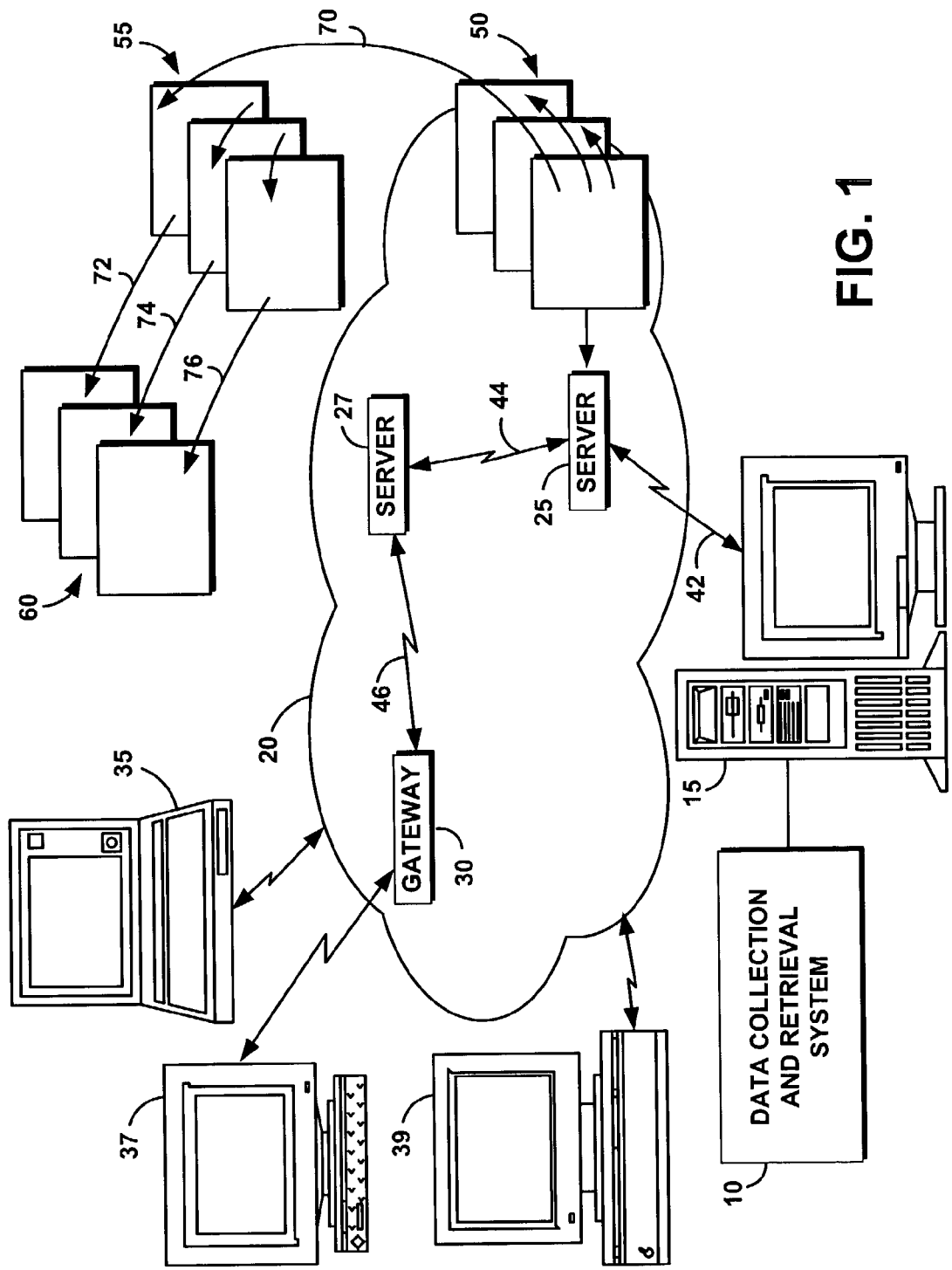
FIG. 1 is a schematic illustration of an exemplary operating environment in which a data collection and retrieval system of the present invention can be used.

FIG. 1 portrays the overall environment in which a data collection and retrieval system 10 according to the present invention may be used. The system 10 includes a software or computer program product that is typically embedded within, or installed on a host server (or a client server or machine) 15. Alternatively, the system 10 can be saved on a suitable storage medium such as a diskette, a CD, a hard drive, or like devices. While the system 10 will be described in connection with the WWW, the system 10 can be used with a stand-alone database of terms that may have been derived from the WWW or other sources.

The cloud-like communication network 20 is comprised of communication lines and switches connecting servers such as servers 25, 27, to gateways such as gateway 30. The servers 25, 27 and the gateway 30 provide the communication access to the Internet. Users, such as remote Internet users, are represented by a variety of computers such as computers 35, 37, 39, and can query the host server 15 for desired information through the communication network 20.

The server 15 is connected to the network 20 via a communications link 42 such as a telephone, cable, or satellite link. The servers 25, 27 can be connected via high-speed Internet network lines 44, 46 to other computers and gateways. The servers 25, 27 provide access to stored information such as hypertext or Web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various Web servers such as the server 27.

Typically, the system 10 accesses Web pages that have been selected by the user. These Web pages are the source of the data to be transferred to a user defined database. As an example, in FIG. 2 the data collection and retrieval system 10 connects through the communication network 20 to an Internet portal 205 such as Yahoo!®. The user selects a subsite 210 on Yahoo!®, and continues selecting subsites as shown by sub-subsite 215, until a webpage such as webpage 220 is found that contains the data in which the user is interested to transcribe (or copy) to a database or storage 370.

Figure 3:
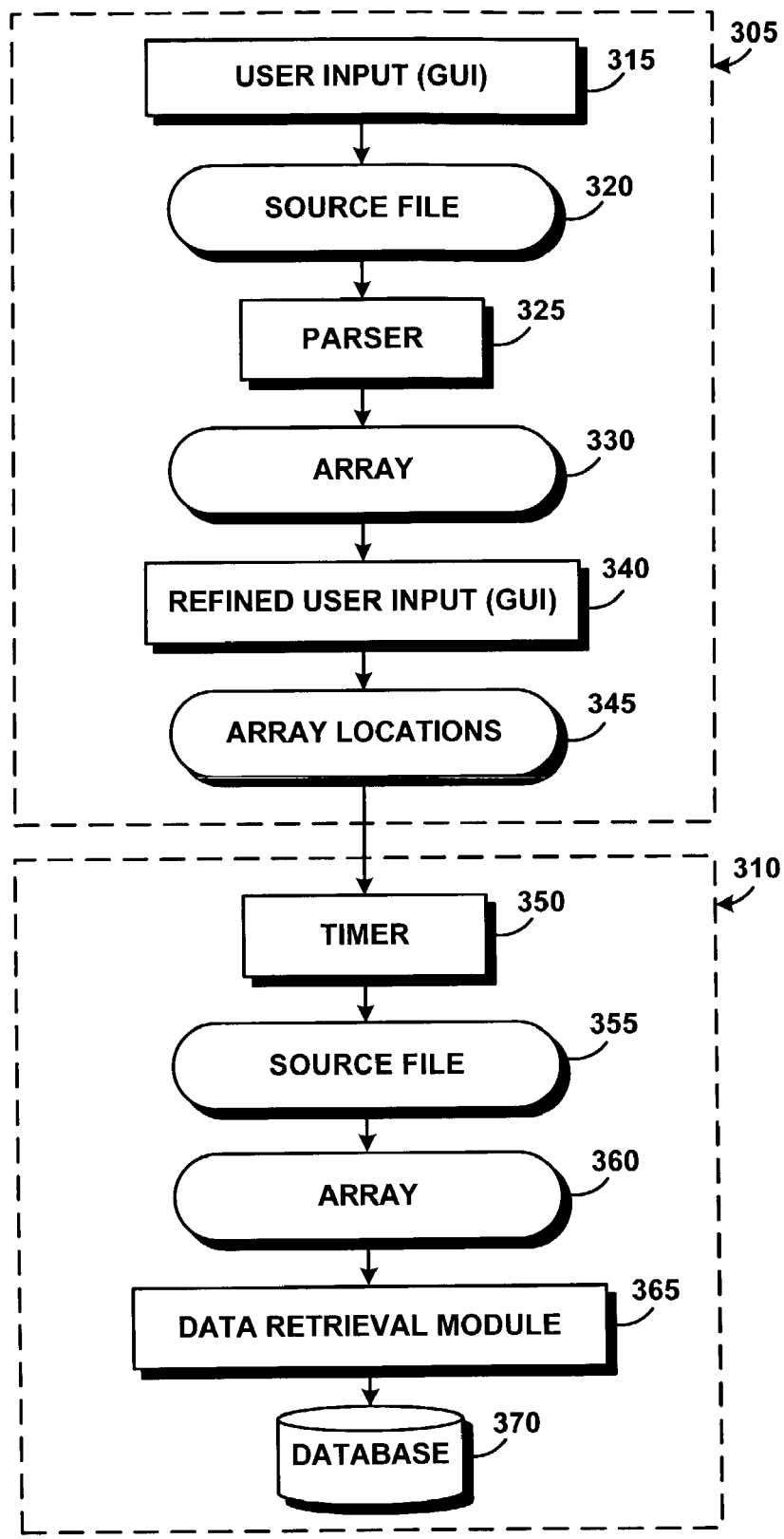
FIG. 3 is a block diagram that illustrates a high level architecture of the system of FIG. 1 shown used in the context of the World Wide Web.

An exemplary high-level architecture of the data collection and retrieval system 10 is shown in FIG. 3. System 10 includes an initialization stage 305 and an automatic execution stage 310. The initialization stage 305 provides the user interface that allows the user to select a source Web page, i.e., 220, the target database, i.e., 370, that will receive and store the data, and the timing criteria for the automatic transfer of data.

The automatic execution stage 310 automatically transfers the data from the HTML source file 320 for the Web page 220, to the target database 370 as instructed by the user in the initialization stage 305. The initialization stage 305 includes a user input GUI 315, a source file 320, the parser 325, an array file 330, a refined user GUI 340, and an array locations file 345. The automatic execution stage 310 includes a timer 350, a defined source file 355, an array file 360, a data retrieval module 365, and the target database 370.

Figure 2:
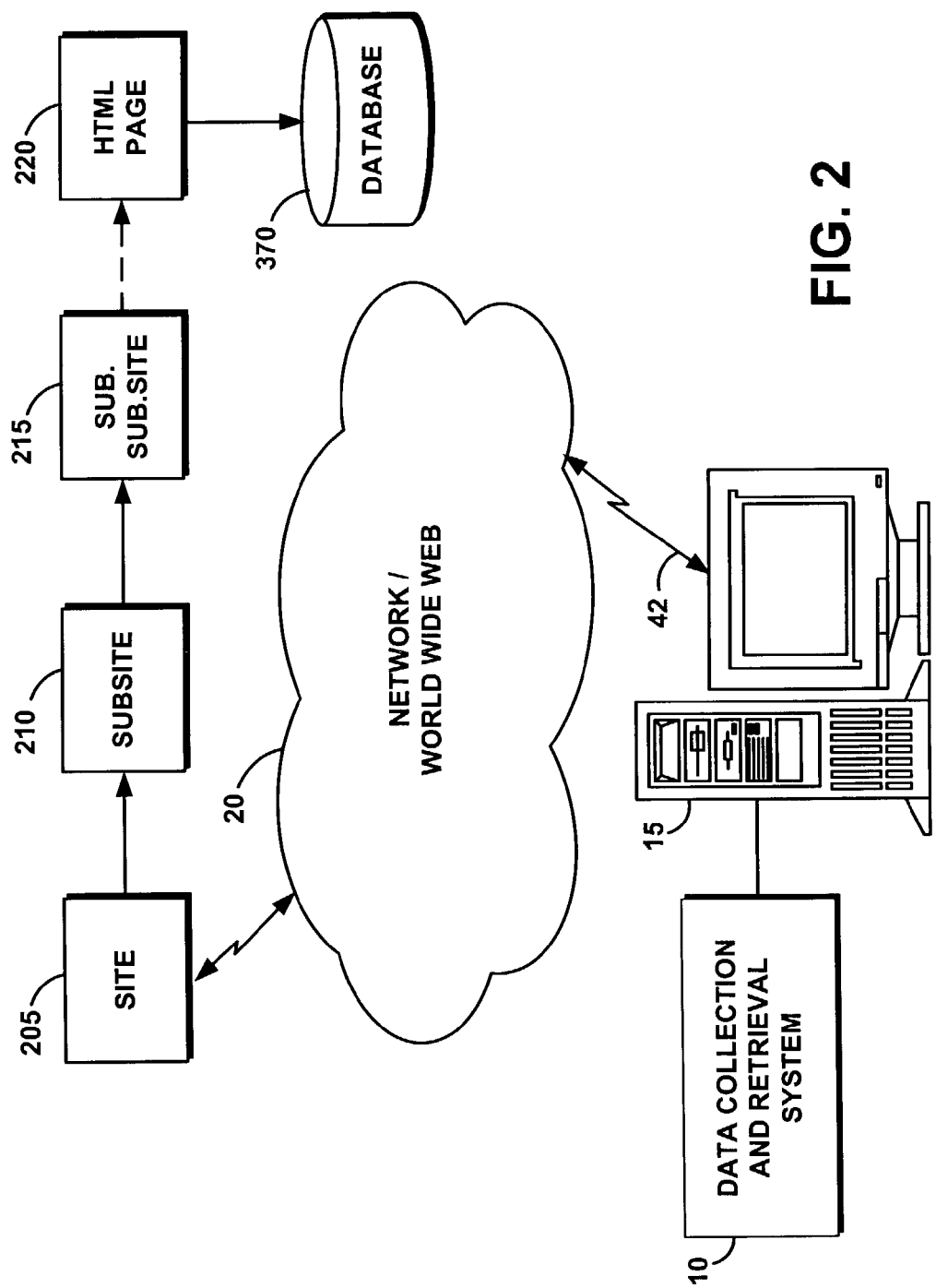
FIG. 2 is a schematic illustration further showing the manner in which the data collection and retrieval system of the present invention accesses data residing on various Web pages.
Figure 4:
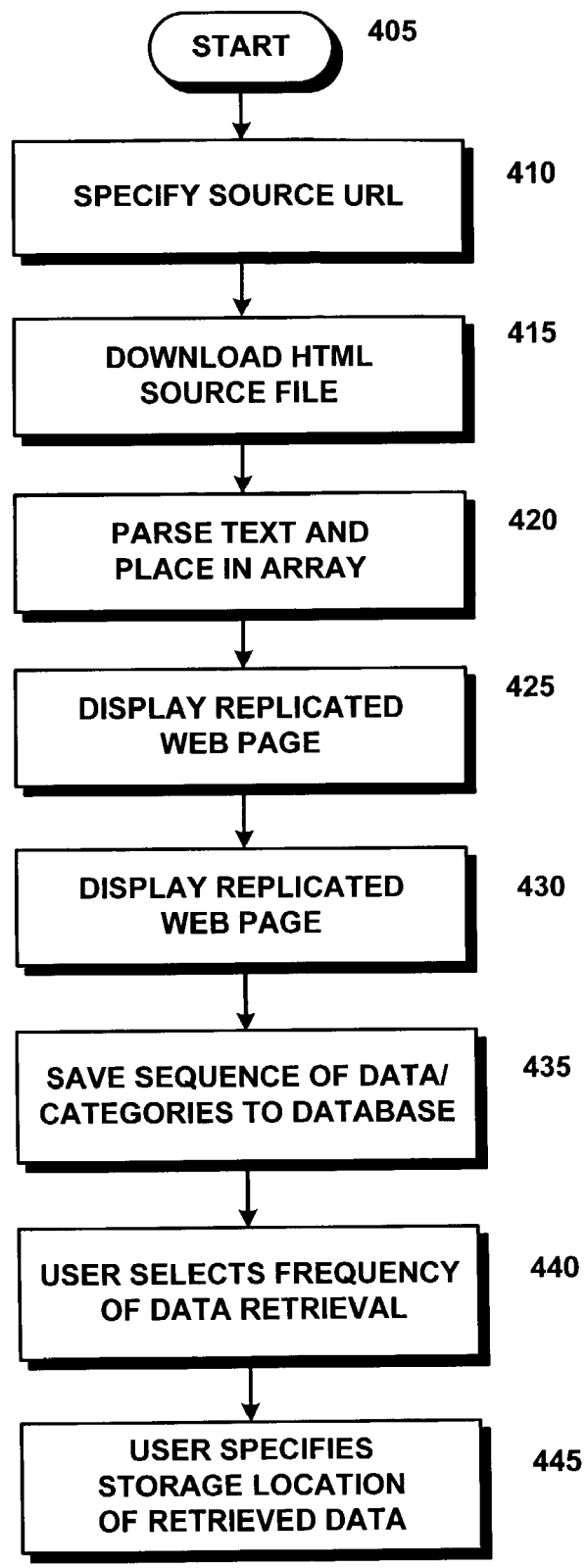
FIG. 4 is a flow chart that depicts the operation of the initialization stage of the system of FIGS. 1 and 3.
Figure 5A:
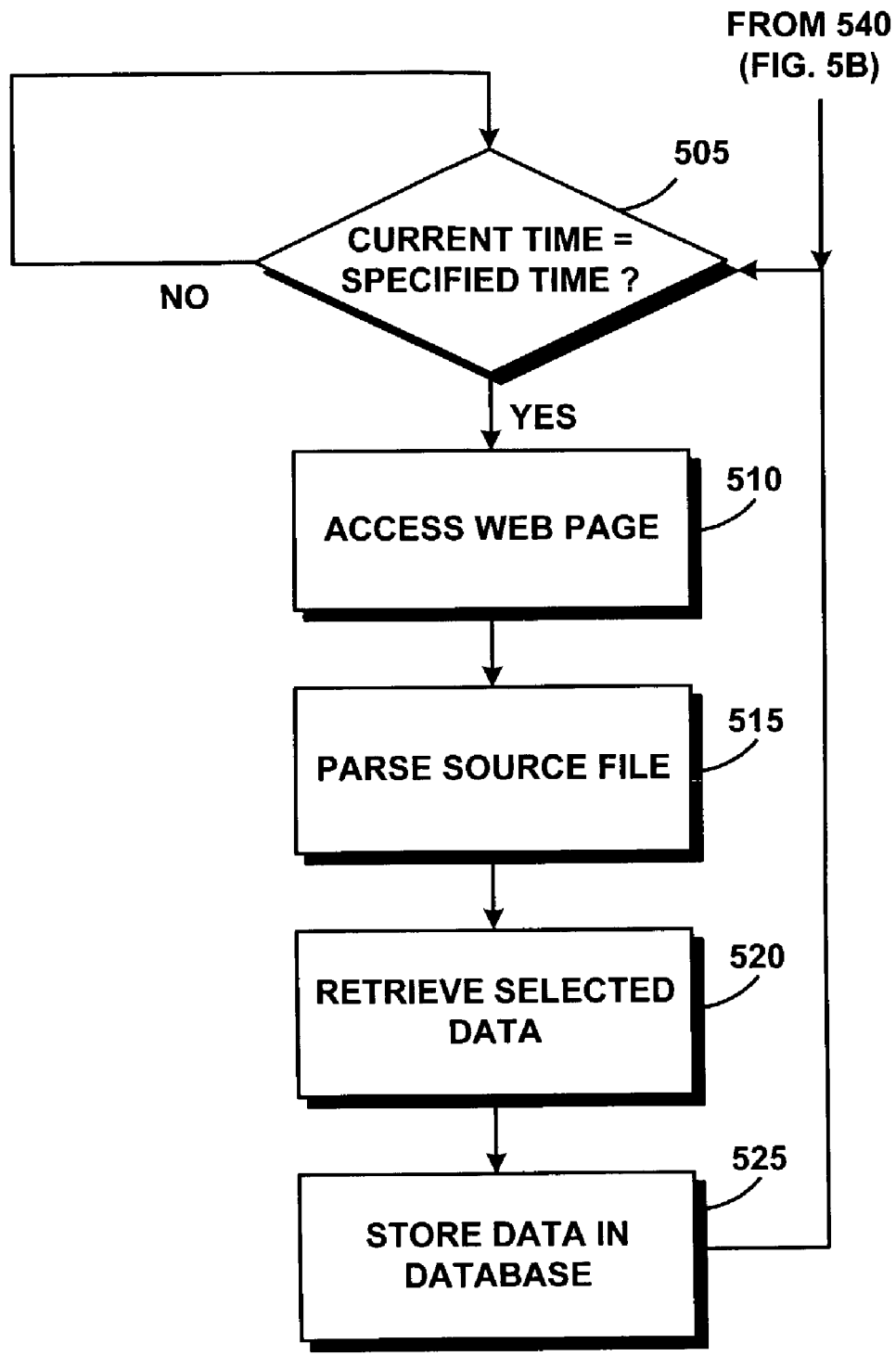
FIG. 5 is comprised of FIGS. 5A and 5B, and represents a flow chart that depicts the operation of the automatic execution stage of the system of FIGS. 1 and 3.
Figure 5B:
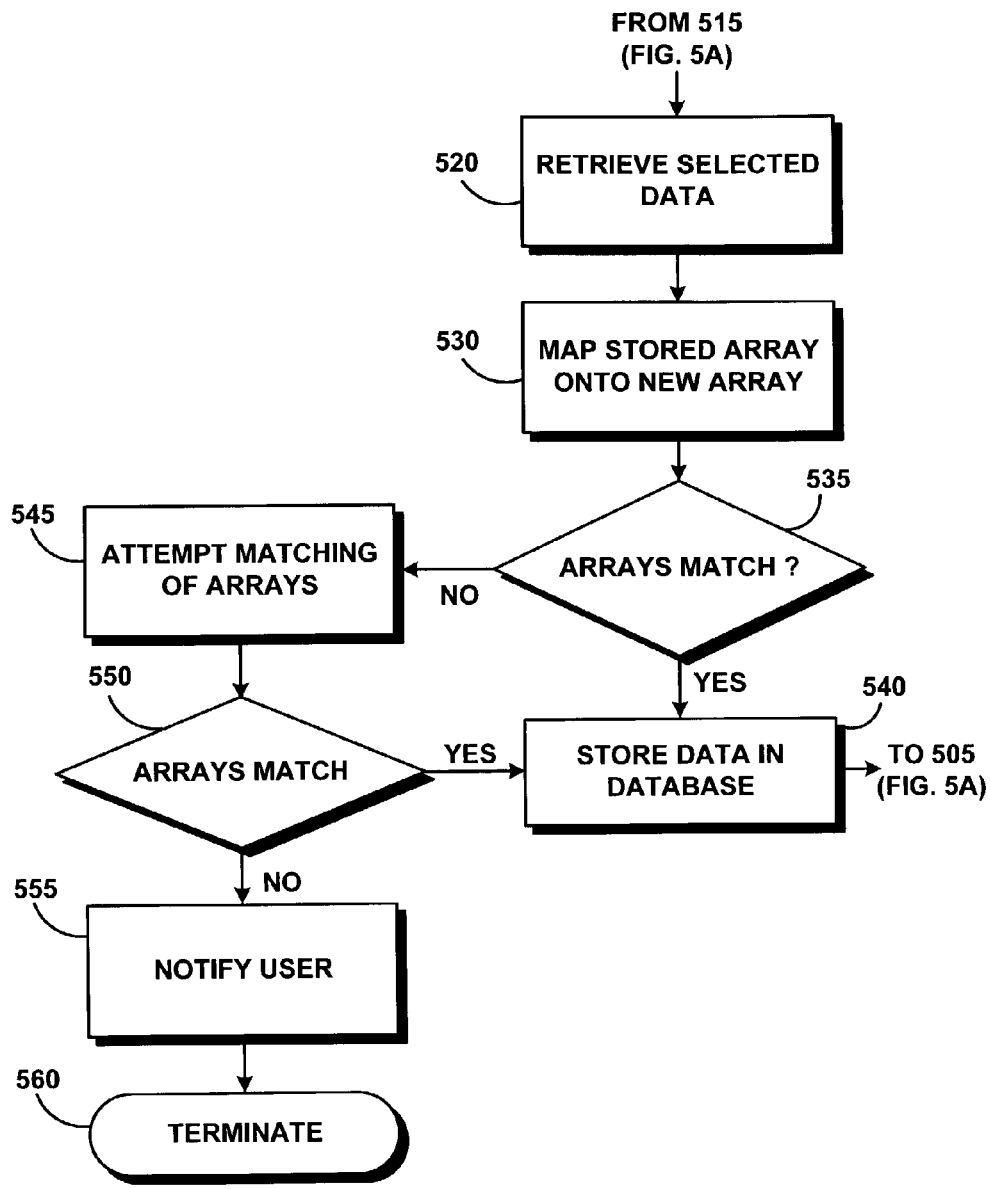

In operation, and with further reference to the operational flowcharts of FIGS. 4 and 5, the user opens system 10 in step 405, and the system 10 displays the user input GUI 315. In step 410, the user specifies the URL for an HTML page 220 that contains data to be transcribed to the target database 370. In so doing, the user selects the Web page 220 as shown by FIG. 2, and saves the Web page URL in system 10. The user may select the URL of the source file (320) by manually selecting the Web page URL and copying it to a specific field. Alternatively, the user may open the URL for a source file 320 and automatically save the address to a "favorites" list in a designated list, field, drop-down menu, or list box.

System 10 then downloads the HTML source file 320 for the Web page 220 in step 415. In step 420 the parser 415 processes the source file 320, tokenizes the HTML format of the Web page 220 and places it in a data array 330. Ideally, the parser 325 divides the data in the source into identifiable units of the Web page 220, exactly replicating the Web page 220 and displaying the replicated Web page to the user in step 425 as the refined user input GUI 340. The purpose of the parsing is to isolate potentially usable data and to describe how to subsequently locate this data in the Web page source. The system 10 presents a possible schema for storing the selected data in a relational database. This may be based on existing tables in the database, or it may be a default schema constructed to match the selected data. If needed, the system 10 creates the database schema and automatically transfers the data to the database, performing data type conversions as necessary.

Preferably, but not necessarily, the user has access only to data that is embedded in the HTML source file 320 of the replicated Web page. For example, the user might select a Web page 220 containing stock quotes for a variety of stocks. From Web page 220, the user can only select quotes that are displayed and part of the HTML source file 320.

The user then selects data and or categories of interest in step 430. In step 435, system 10 saves the sequence of data or categories selected by the user to an array locations file 345. System 10 remembers the location of the data in the array 330 and retrieves data from the same locations on each successive data transfer.

In step 440, the user sets the timer 350 by selecting the frequency of data retrieval; i.e., every 5 minutes, 15 minutes, at a specific time such as 12:00 p.m., etc. The selection frequencies can be stored along with other control information, in database tables. Examples of such other control information include URLs, data arrays, user-selected data element locations and formats, and locations for storing the data in the database. The user then specifies in step 445 where to store the retrieved data, such as database 370. The retrieved data may be stored in a specific database, the user may specify specific fields and records in the database, and the user may also specify the format the data should assume after it has been transferred.

The initialization stage 305 is complete once the user has specified the source file 320, the desired data or categories for retrieval, the destination for the retrieved information, database 370, and the frequency of operation. System 10 can now perform the automatic retrieval of data as illustrated by the process flow charts of FIGS. 5A and 5B.

At a time specified by the user, the timer 350 automatically begins the data retrieval process in step 505 and accesses the Web page 220 in step 510. Each time system 10 accesses the Web page 220, a new source file 355 is created to reflect the changing data on the Web page 220. The parser 325 parses the source file 355 in step 515 and creates an array file 360 in which the data is accessible to the data retrieval module 365.

The data retrieval module 365 extracts the data from the array 360 in step 520 and places it in step 525 in the database 370 as previously specified by the user. This process is repeated by the timer 350 at the frequency or times previously specified by the user in step 440 of FIG. 4.

Optionally, after system 10 retrieves selected data from the source file 355 in step 520, system 10 may map the data previously stored in database 370 onto the new array 355 retrieved from the source file 320 in step 530. If in step 535 the stored array in database 370 matches array 360, system 10 continues to step 540 and transfers the data in array 320 to the appropriate locations in database 370. Operational control then transfers back to the timer 350 in step 505 until the next specified time occurs.

If, however, the two arrays do not match in step 535, system 10 automatically attempts to adjust the new array 360 to match the array stored in database 370 in step 545. If the arrays match in step 550, system 10 proceeds, as before, to step 540, stores the data in database 370, and returns control to the timer in step 505. If the new array 360 does not match the array stored in database 370, system 10 notifies the user in step 555, and stops the data retrieval process in step 560 until the user approves the adjustment or reconfigures the retrieval process.

Figure 6:
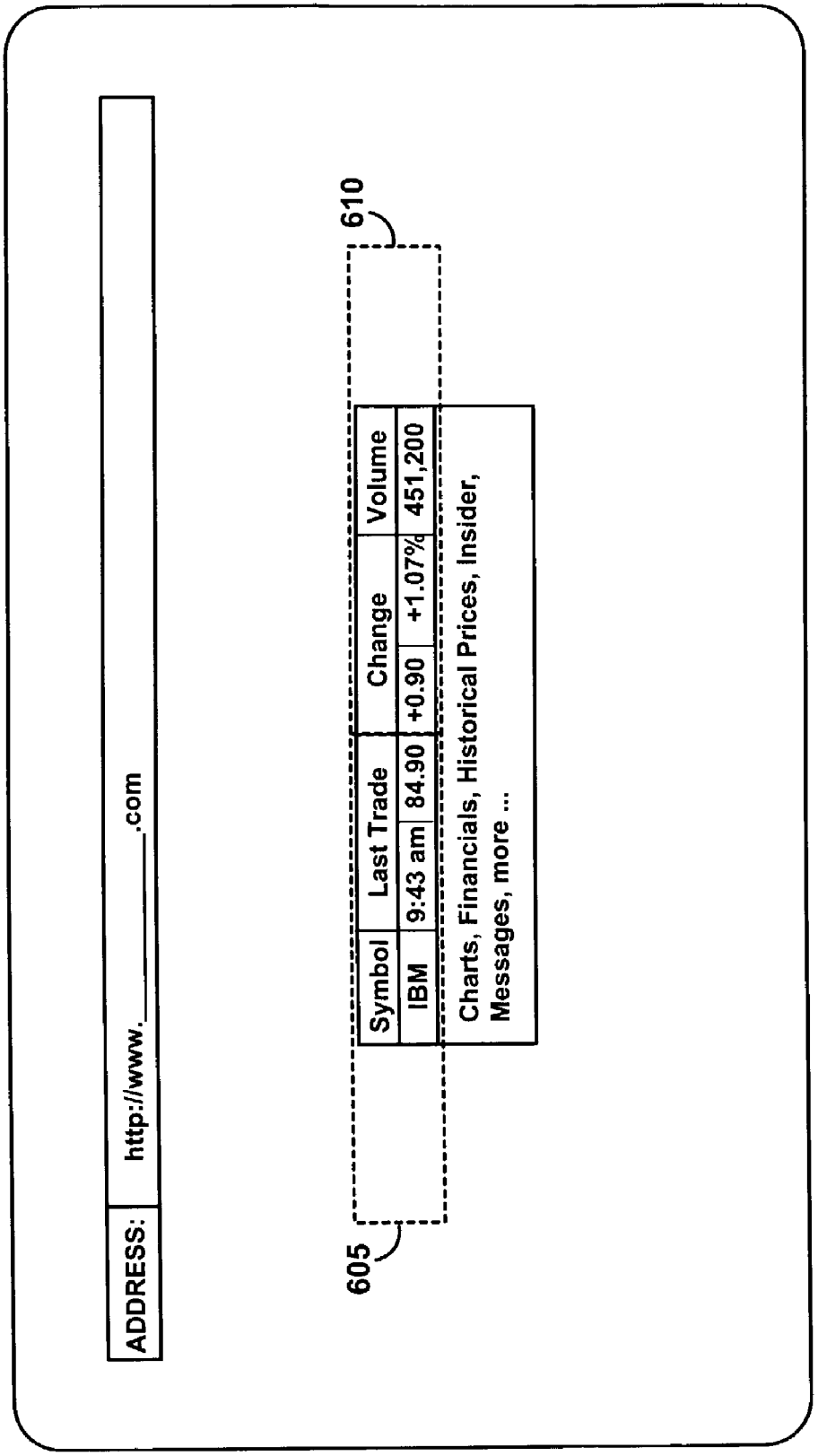
FIG. 6 is a screen shot of a Web page with data that can be collected and retrieved by the system of FIG. 1.

An example of an exemplary webpage 220 from which a user wishes to transcribe data is shown in FIG. 6. The data the user wants to collect and retrieve is shown, for instance, at locations 605 and 610. The user may specify that system 10 retrieve just the data, or the data and categories describing the data (i.e., metadata). At location 605, the user selects both the category and data as shown in Table 1 below.

TABLE 1

Categories and data location 605

| Category | Data |
| --- | --- |
| Stock Symbol | IBM |
| Last Trade | 9:43 am |
|  | 84.90 |
| Change | +0.90 |
|  | +1.07 |
| Volume | 451,200 |

The value for price and time at location 605 does not have a complete descriptive category, so the user provides to system 10 the desired category "Last Trade Time" and "Last Trade Value" for the values listed under "Last Trade". Similarly, the user assigns new categories "change Value" and "Change Percent" to differentiate the two values found under the category "Change" at location 605. The user also wishes to select the date and time this transaction took place. This data is found at location 610, but has no associated categories. The user selects the value "May 23, 2002" and assigns the category "Date" and selects "10:03 am ET" and assigns the category "Transfer Time".

The data as stored in the target database 370 is shown in Table 2 below.

TABLE 2

Categories and data stored in the target database 370.

| Category | Data |
| --- | --- |
| Stock Symbol | IBM |
| Last Trade Time | 9:43 am |
| Last Trade Value | 84.90 |
| Change Value | +0.90 |
| Change Percent | +1.07% |
| Volume | 451,200 |
| Date | May 23, 2002 |
| Transfer Time | 10:03 am ET |

The user then specifies the times data should be transferred from the Web page to the database: 12 p.m., 3 p.m., and 5 p.m. eastern standard time. System 10 then sets the timer 350 to initiate data collection and retrieval at those times, transferring the data from Web page 220 to database 370 at those times, in the configuration specified by the user.

It is to be understood that the specific embodiments of the invention that have been described are merely illustrative of certain application of the principle of the present invention. Numerous modifications may be made to the data collection and retrieval system invention described herein without departing from the spirit and scope of the present invention. Moreover, while the present invention is described for illustration purpose only in relation to the WWW, it should be clear that the invention is applicable as well to any collection of data or databases accessible either through an Internet or Intranet connection.

What is claimed is:

1. A computer-implemented method of selectively retrieving data from a source file on a public network and automatically collecting retrieved data in a target database, comprising:

initializing a data retrieval stage by:

selecting the source file;
parsing selected data elements in the source file into a list of data elements;
selecting at least one of the data elements from the list to be stored in the target database;
identifying source locations of the selected at least one of the data elements;
selecting the target database and target locations in the target database where the at least one of the data elements is to be stored in the target database;
saving the source locations and target locations of the at least one of the parsed data elements in a location file in the target database;
setting a schedule frequency for transferring the at least one of the parsed data elements from the source locations to the target locations in the location file in the target database; and
automatically, selectively parsing new data elements corresponding to the at least one of the parsed data elements previously selected during the initialization of the data retrieval stage, pursuant to the schedule frequency, by transferring the selectively parsed new data elements from the saved source locations in the source file to the saved target locations in the target database.

2. The method of claim 1, further comprising processing the selectively parsed new data elements stored in the target database.

3. The method of claim 2, wherein processing the selectively parsed new data elements is executed automatically.

4. The method of claim 1, wherein the source file is formatted with tags.

5. The method of claim 1, wherein the at least one of the data elements from the sources locations are derived from an application output file.

6. The method of claim 1, wherein the at least one of the data elements from the sources locations are derived from an output of a server program.

7. The method of claim 1, wherein the target database is a relational database.

8. The method of claim 1, wherein initializing the data retrieval stage further comprises presenting selection options to a user.

9. The method of claim 1, wherein the at least one of the data elements is dynamic.

10. The method of claim 9, wherein initializing the data retrieval stage further comprises analyzing the new data elements.

11. The method of claim 10, wherein the new data elements comprise data that changes periodically.

12. The method of claim 1, wherein processing the new data elements is executed manually.

13. The method of claim 1, further comprising automatically updating data elements stored in the target database.

14. The method of claim 13, wherein automatically updating the data elements stored in the target database comprises periodically retrieving new data elements and updating the data elements stored in the target database with the retrieved new data elements.

15. The method of claim 1, further comprising reinitializing the data retrieval stage.

16. A computer program product having instruction codes for selectively retrieving data from a source file on a public network and for automatically collecting retrieved data in a target database, comprising:
a first set of instruction codes for initializing a data retrieval stage by:
selecting the source file;
parsing selected data elements in the source file into a list of data elements;
selecting at least one of the data elements from the list to be stored in the target database;
identifying source locations of the selected at least one of the data elements;
selecting the target database and target locations in the target database where the at least one of the data elements is to be stored in the target database;
saving the source locations and target locations of the at least one of the parsed data elements in a location file in the target database;
setting a schedule frequency for transferring the at least one of the parsed data elements from the source locations to the target locations in the location file in the target database; and
a second set of instruction codes for automatically, selectively parsing new data elements corresponding to the at least one of the parsed data elements previously selected during the initialization of the data retrieval stage, pursuant to the schedule frequency, by transferring the selectively parsed new data elements from the saved source locations in the source file to the saved target locations in the target database.

17. The computer program product of claim 16, wherein the source file is formatted with tags.

18. The computer program product of claim 16, wherein the at least one of the data elements from the sources locations are derived from an application output file.

19. The computer program product of claim 16, wherein the at least one of the data elements from the sources locations are derived from an output of a server program.

20. A computer-implemented system for selectively retrieving data from a source file on a public network and for automatically collecting retrieved data in a target database, comprising:
means for initializing a data retrieval stage by:
selecting the source file;
parsing selected data elements in the source file into a list of data elements;
selecting at least one of the data elements from the list to be stored in the target database;
identifying source locations of the selected at least one of the data elements;
selecting the target database and target locations in the target database where the at least one of the data elements is to be stored in the target database;
saving the source locations and target locations of the at least one of the parsed data elements in a location file in the target database;
setting a schedule frequency for transferring the at least one of the parsed data elements from the source locations to the target locations in the location file in the target database; and
means for automatically, selectively parsing new data elements corresponding to the at least one of the parsed data elements previously selected during the initialization of the data retrieval stage, pursuant to the schedule frequency, by transferring the selectively parsed new data elements from the saved source locations in the source file to the saved target locations in the target database.

* * * * *